United States Patent [19]

Mason et al.

[11] Patent Number: 4,568,708

[45] Date of Patent: Feb. 4, 1986

[54] COMPOSITION AND METHOD FOR EFFECTING SEALS IN EARTH BOREHOLES

[75] Inventors: Carl E. Mason, Bedford, Pa.; Samuel E. Geffen, Aurora, Colo.

[73] Assignee: NL Industries, Inc., New York, N.Y.

[21] Appl. No.: 622,694

[22] Filed: Jun. 20, 1984

Related U.S. Application Data

[62] Division of Ser. No. 387,171, Jun. 10, 1982, Pat. No. 4,463,808.

[51] Int. Cl.$^4$ .............................................. E21B 33/138
[52] U.S. Cl. ..................................... 523/130; 166/293; 252/8.55 R
[58] Field of Search ................... 106/287.34; 166/292, 166/293, 294, 295; 252/8.5 A, 8.5 P, 8.5 LC, 8.55 R; 523/130, 131, 132

[56] References Cited

U.S. PATENT DOCUMENTS

| | | | |
|---|---|---|---|
| 2,836,555 | 5/1958 | Armentrout | 166/292 X |
| 3,028,913 | 4/1962 | Armentrout | 166/292 |
| 3,082,823 | 3/1963 | Hower | 166/29 X |
| 3,323,603 | 6/1967 | Lummus et al. | 175/65 |
| 3,396,790 | 8/1968 | Eaton | 166/270 |
| 3,407,878 | 10/1968 | Engle | 166/294 |
| 3,447,608 | 6/1969 | Fry et al. | 166/293 |
| 3,909,421 | 9/1975 | Gaddis | 252/8.55 D |
| 4,182,417 | 1/1980 | McDonald et al. | 166/295 |
| 4,201,679 | 5/1980 | Barker | 252/8.5 A |
| 4,391,925 | 7/1983 | Mintz | 166/292 X |
| 4,475,594 | 10/1984 | Drake | 166/294 |

OTHER PUBLICATIONS

Scanley, "Fluid Loss Controlled by . . . Acrylic Polymers as Drilling Mud Additives", *World Oil*, Jul., 1959, pp. 122, 124, 126 and 128.

*Primary Examiner*—Dennis L. Albrecht
*Attorney, Agent, or Firm*—Browning, Bushman, Zamecki & Anderson

[57] ABSTRACT

A well fluid and method for borehole sealing such as grouting or plugging, the fluid being comprised of water, a water swellable clay and a water dispersible polymer which prevents immediate hydration of the clay.

2 Claims, No Drawings

COMPOSITION AND METHOD FOR EFFECTING SEALS IN EARTH BOREHOLES

This is a division of application Ser. No. 387,171, filed June 10, 1982, now U.S. Pat. No. 4,463,808.

BACKGROUND OF THE INVENTION

The present invention relates to well servicing fluids. More specifically, the present invention relates to a composition and method for effecting sealing, grouting or plugging in earth boreholes.

Other than oil and gas wells, there are numerous instances where it is necessary to effect sealing in certain areas in drilled earth boreholes. Such boreholes occur, for example, in water well drilling, in observation holes for construction and engineering purposes such as hydrology studies, in mineral exploration boreholes and in seismic shot holes. Fo example, it is common practice in the case of water wells to grout or seal well casing by filling the annulus between the casing and the wall of the borehole. Additionally, it is often necessary when an earth borehole is abandoned to plug it to prevent the commingling of aquifier(s) water and/or to prevent entry of contaminants from the surface.

Heretofore, casing sealing and grouting, and plugging, has been accomplished by cementing techniques which are expensive, not always effective, and generally not usable with plastic casing due to the heat evolved when the cement is setting causing the casing to deform. It has also been common in such sealing or grouting, as well as in hole abandonment procedures, to use slurries of water swellable clays, e.g. bentonite; however, the use of water swellable clays is disadvantageous in that, since the clays tend to swell almost immediately when placed in water, particularly if subjected to any shearing such as will occur during pumping, only a relatively low level of solids can be carried in the slurry to the site in the borehole where the sealing is to be carried out.

SUMMARY OF THE INVENTION

It is therefore an object of the present invention to provide an improved well servicing fluid for use in earth borehole sealing procedures such as grouting or sealing casing, or plugging in well hole abandonment.

Another object of the present invention is to provide a well servicing fluid for borehole sealing operations which is pumpable and has a relatively high solids content.

Still another object of the present invention is to provide a well servicing fluid having a high solids content in which the solids are inhibited from swelling until emplaced in the boreholes.

Yet a further object of the present invention is to provide a method for effecting a seal in an earth borehole.

The above and other objects of the present invention will become apparent from the description given herein and the appended claims.

In one aspect the present invention provides a well servicing fluid for use in earth borehole sealing operations such as sealing or grouting casing, plugging in hole abandonment and the like, the composition comprising water, a water swellable clay and an effective amount of a water dispersible polymer, the polymer being of a type which prevents substantial swelling of the clay until the well fluid is emplaced in a predetermined location in an earth borehole.

In another embodiment of the present invention, there is provided a method of effecting sealing in an earth borehole in which the composition described above is emplaced, in a predetermined location, in an earth borehole following which the water swellable clay is permitted to swell to effect a seal.

DESCRIPTION OF THE PREFERRED EMBODIMENTS

As used herein, the term "sealing" includes grouting, packing off, plugging, and similar operations in which a predetermined portion or space in a borehole, e.g. between a section of casing and the wall of the borehole, is filled to thereby effectively prevent the passage of gases or liquids therethrough or collapse of the formation adjacent the sealed area.

The well servicing fluid of the present invention comprises fresh water, i.e. water substantially free of salts, particularly salts of divalent metal ions such as calcium. Such salts, particularly those of divalent metal ions inhibit the swelling of clay and thereby prevent effective sealing.

The clays useful in the composition of the present invention can comprise any water swellable mineral. Generally, such clays, while varying widely in composition, contain aluminum silicate, are essentially insoluble in water but disperse into small particles under hydration, shearing forces such as grinding, pumping, etc. Examples of such clays include bentonite, attapulgite, natural clays, etc. The particle size of the clays used can vary widely, however, it has been found that the smaller the particle size, the more rapidly the clays swell and hence the more rapidly they must be emplaced in the seal site in the well bore. A particularly desirable clay is bentonite, especially a bentonite known as BEN-SEAL marketed by NL Baroid, Houston, Tex. The clay will generally be present in the composition of the present invention in amounts of from about 2 to about 4 lbs. per gallon of the well fluid.

The polymers useful in the present invention act as swelling retardants and inhibit swelling of the clay until the well fluid can be emplaced at the predetermined location in the borehole. As noted above, a common characteristic of water swellable clays is their tendency to hydrate either by means of absorption and/or adsorption when placed in water, particularly if subjected to any shearing forces such as by mixing, pumping, etc. Generally speaking, the polymers useful in the present invention are water dispersible, i.e. they are soluble so as to form a homogeneous medium or if not soluble, can be formed into a heterogeneous system such as a colloid, emulsion, etc. in which the solid particles will remain, albeit descreet, generally uniformly distributed throughout the water and will not readily precipitate. A particularly desirable polymer for use in the present invention is polyacrylamide, particularly hydrolyzed polyacrylamide. It is especially desirable to use an emulsion polymerized hydrolyzed polyacrylamide containing approximately 30% by weight of the polyacrylamide. It will be understood that the polymer can be in solid or liquid form, e.g. an emulsion or latex, the only requisite being that it be water dispersible, as described above. The polymer must also be one which will not coat or interact with the clay in such a way so as to permanently prevent hydration of the clay thereby preventing its swelling. Accordingly, the polymer will be one which will inhibit such hydration for a period of time sufficient to permit the well fluid to be placed in the desired portion of the borehole to effect the sealing. The amount of polymer employed, i.e. an effective amount, will depend upon the amount of clay employed, the volume in the borehole to be sealed or filled and other such parameters. The term "an effective amount," as used herein, is an amount of the polymer which, depending on the amount of clay employed, will retard substantial hydration (swelling) of the clay for a period of time sufficient to permit emplacement of the well fluid in the desired location in the wellbore. Generally speaking, however, when the clay is present in the amount specified above, and when the preferred polyacrylamide is used, the polymer will be present in amounts of from aout 0.01% to about 1.5% by weight of the well fluid.

In carrying out the method of the present invention, the well fluid is prepared by adding the polymer to the water with sufficient mixing to provide a uniform dispersion, e.g. solution. The clay is then added to the polymer-water dispersion with gentle mixing so as to prevent immediate hydration of the clay. The thus prepared fluid is then emplaced, by any one of several techniques, at the desired point in the wellbore which may be, for example, between a section of casing and the wall of the wellbore. For example, the well servicing fluid can be pumped through a roll hose or flexible pipe to the desired location, the hose being withdrawn while emplacement of the fluid is taking place. Alternately, the fluid can be pumped through a drill string from which the bit has been removed, the string being withdrawn as the swelling clay is discharged into the open hole immediately below the string.

Alternatively, the polymer-water dispersion can be introduced into the wellbore following which the water swellable clay is introduced into the wellbore, swelling of the clay being retarded by the polymer until the clay is in the desired location in the wellbore. It has generally been found that when a well fluid comprised of water and the above-specified amounts of bentonite and polyacrylamide is employed, emplacement of the well servicing fluid should be accomplished within 20 minutes of preparation.

It will be recognized that the present invention provides a well servicing fluid having a high solids content and which is easily pumpable due to the fact that swelling of the clay is retarded until the fluid has been emplaced at the desired location in the well bore.

EXAMPLE

A fluid containing fresh water, a 30% by weight emulsion polymerized, hydrolyzed polyacrylamide and BEN-SEAL (bentonite) was prepared as described above. The polymer was present in an amount of about 0.75 qt./100 gal. of the fluid, the bentonite being present in an amount of about 2.75 lbs./gal. of well fluid. The fluid was used to plug an $8\frac{3}{4}''$ borehole, the plug length being 438'. The fluid was easily pumpable. Appreciable swelling of the bentonite did not occur until the fluid was emplaced at the desired location in the well bore.

The invention may be embodied in other specific forms without departing from the spirit or essential characteristics thereof. The foregoing embodiments are therefore to be considered, in all respects, as illustrative and not restrictive, the scope of the invention being indicated by the appended claims rather than by the foregoing description, and all changes which come within the meaning and range of equivalence of the claims are therefore intended to be embraced therein.

We claim:

1. A well servicing fluid consisting essentially of salt-free water, from about 2 to about 4 lbs. per gallon of bentonite, and from about 0.1% to about 1.5% by weight of a water dispersible polymer selected from the class consisting of polyacrylamide, hydrolyzed polyacrylamide and mixtures thereof, said polymer being of a type which inhibits swelling of said clay for a period of time sufficient to permit emplacement of said servicing fluid at a predetermined location in a borehole.

2. The well fluid of claim 1 wherein said hydrolyzed polyacrylamide is in emulsion form.

* * * * *